United States Patent
Desautels et al.

[11] Patent Number: 5,830,104
[45] Date of Patent: Nov. 3, 1998

[54] ENGINE SPEED RETARDATION ON TRANSMISSION UPSHIFT

[75] Inventors: Thomas Desautels, West Bloomfield; Edward M. Bacon, Northville; Steve M. Weisman, Farmington Hills, all of Mich.

[73] Assignee: Meritor Heavy Vehicle Systems, LLC, Troy, Mich.

[21] Appl. No.: 857,409

[22] Filed: May 16, 1997

Related U.S. Application Data

[63] Continuation of Ser. No. 508,111, Jul. 27, 1995, Pat. No. 5,679,093.

[51] Int. Cl.$^6$ .................................................. B60K 41/04
[52] U.S. Cl. ............................................ 477/109; 477/124
[58] Field of Search .................................. 477/107, 109, 477/111, 122, 124

[56] References Cited

U.S. PATENT DOCUMENTS

| | | | |
|---|---|---|---|
| 3,898,894 | 8/1975 | Aono et al. | |
| 4,510,900 | 4/1985 | Quenneville. | |
| 4,593,580 | 6/1986 | Schulze. | |
| 4,787,044 | 11/1988 | Nagata et al. | 364/431.03 |
| 4,817,470 | 4/1989 | Müller et al. | 477/124 |
| 5,089,962 | 2/1992 | Steeby | 477/124 |
| 5,239,894 | 8/1993 | Oikawa et al. | 477/107 |
| 5,239,895 | 8/1993 | Kröger | 477/109 |
| 5,305,213 | 4/1994 | Boardman et al. | 477/109 |
| 5,323,667 | 6/1994 | Tweed et al. | 477/122 |
| 5,413,012 | 5/1995 | Davis | 477/124 |
| 5,425,284 | 6/1995 | Davis | 477/124 |
| 5,433,676 | 7/1995 | Abe et al. | 477/109 |
| 5,487,004 | 1/1996 | Amsallen | 477/109 |
| 5,568,387 | 10/1996 | Andersson | 477/107 |

FOREIGN PATENT DOCUMENTS

| | | |
|---|---|---|
| 0638455 | 2/1995 | European Pat. Off. . |
| 0686789 | 12/1995 | European Pat. Off. . |
| 4446120 | 12/1994 | Germany . |
| 2100384 | 5/1982 | United Kingdom . |

*Primary Examiner*—Charles A. Marmor
*Assistant Examiner*—Sherry Lynn Estremsky

[57] ABSTRACT

An improved engine control provides rapid decrease in the output speed of the engine when an upshift of the transmission is being actuated. The system selectively actuates a speed retardation system to decrease the engine output speed to match a desired engine output speed at the next highest gear ratio. In one embodiment, an engine control actuates engine braking to achieve this rapid speed reduction. In other embodiments, an additional load may be placed on the engine, such as the actuation of a fan. An operator is preferably provided with a shift intent switch that provides an indication to the engine control that an upshift will be actuated. The engine control waits for an indication that the transmission has been moved to neutral. Once this indication is received, the speed retardation system is actuated to rapidly reduce the engine output speed toward a desired value. Most preferably, this feature is incorporated into an engine control system adapted to synchronize the engine output speed to that desired at the next gear ratio, both when the transmission is being upshifted or downshifted. The engine control system allows an operator to achieve a transmission shift without complicated clutching of the transmission.

20 Claims, 1 Drawing Sheet

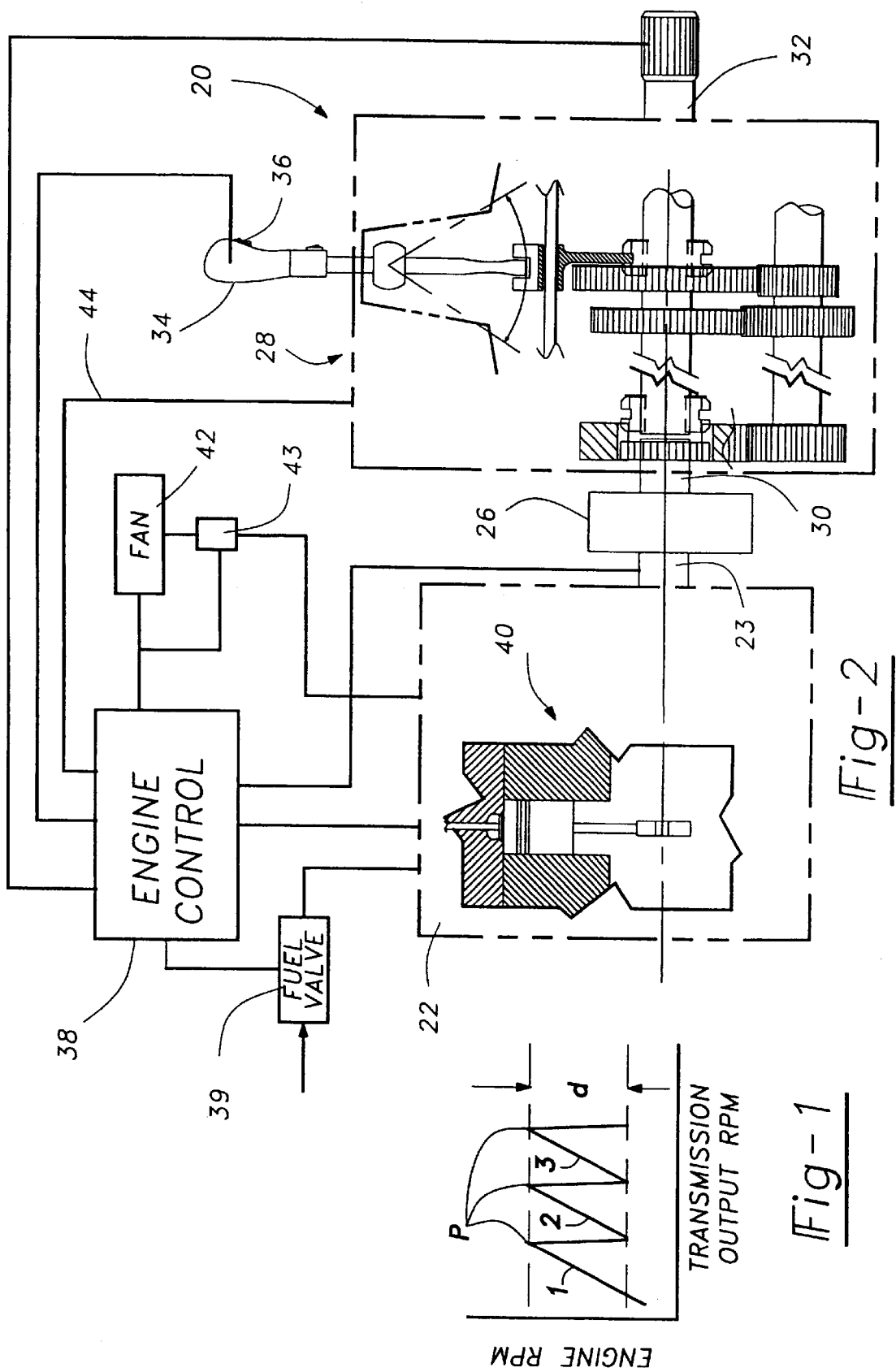

ENGINE SPEED RETARDATION ON TRANSMISSION UPSHIFT

This application is a continuation application of U.S. patent application Ser. No. 08/508,111, which was filed on Jul. 27, 1995 and is now U.S. Pat. No. 5,679,093.

BACKGROUND OF THE INVENTION

This invention relates a system which decays an engine output speed upon receiving an indication of a transmission upshift to more quickly bring the engine speed close to the desired engine speed at the higher gear.

Heavy vehicles are typically equipped with engines that drive a multi-speed transmission through a clutch. A manual stick shift allows an operator to switch between several speed ratios in the transmission. Typically, several selectively actuated sets of intermeshing gears achieve the speed ratios. One of the sets is selectively engaged to provide a desired speed ratio.

Heavy vehicles, such as trucks, require a rather complicated clutching operation to shift between gears. The intermeshing gears which are engaged to drive the transmission output shaft transmit a very large torque load. The operator must initially depress the clutch to eliminate the torque load on the transmission. The operator may then move the gear out of engagement. The operator must then adjust the output speed of the engine to a speed which would approximate the speed necessary to match the speed ratio at the newly selected gear. This adjustment relies upon an operator having a "feel" for the speed that will be necessary at the next gear ratio. The speed of the engine should be adjusted such that when modified by the newly-selected gear, the speed at the transmission output shaft will be matched. In practice, it is typically difficult to exactly match the speed ratio through manual or operator controlled adjustment. Thus, there is always some difference in the speeds when the gears are brought back into engagement. This speed difference results in some hesitation to engagement, or unsmoothness in the transition between the gears. Typically, the operator also actuates the clutch a second time when re-engaging the gear to reduce the resistance to engagement of the newly-selected gear. Thus, the manual shifting of a transmission is a rather complicated procedure.

While experienced truck drivers may be able to easily make transmission shifts, less experienced operators may sometimes have difficulty with this operation. Since shifting of gears is something that must be performed frequently during travel with a manual transmission vehicle, the complicated procedure of shifting gears presents a real burden to an inexperienced operator. Also, vehicles have recently been provided with more complex controls that require more attention from an operator. Thus, even experienced drivers would benefit from a reduction of the complexity of manual shifting between gears.

It would be desirable to achieve a system wherein the operator need not disengage the clutch to perform a transmission shift. Moreover, independent of whether the operator actuates the clutch pedal to shift gears, it would also be desirable to provide an operator with the ability to decrease the engine speed in a timely fashion when the operator is upshifting the vehicle. When an operator is upshifting from a lower gear to a higher gear, a substantial decrease in engine speed must be achieved quickly to provide a smooth transition to the new gear. A lower engine speed is required to achieve the same transmission output speed at the next higher gear. The operator typically decelerates the engine by releasing the accelerator pedal in an attempt to approximate the new required engine speed. However, when upshifting, an immediate decrease of engine speed is more difficult to achieve than the increase of engine speed required with a downshift. Factors including rotational momentum make it somewhat difficult to quickly decrease the engine speed.

SUMMARY OF THE INVENTION

In a disclosed embodiment of this invention, an engine speed retardation system is incorporated into an engine control. The engine speed retardation system is selectively actuated when the engine controller senses that an upshift is occurring. This system is preferably the actuation of some load on the engine to absorb power.

As one example, the engine control may actuate engine braking to rapidly decrease the output speed of the engine. Engine braking is essentially an engine control feature utilized to decrease the output speed of the engine when an indication is made, for example, that the vehicle will be stopped by braking, or is driving downhill. An engine braking system opens certain of the piston cylinders in the engine just prior to the initiation of the power stroke. By exhausting gas from open cylinders prior to the power stroke, the engine braking requires the engine to perform the work necessary to compress the gas, but not to benefit from the resulting power. In this way, speed may be rapidly decreased. In one embodiment, this invention incorporates and actuates engine braking to achieve a rapid decrease in the speed of the engine to approach a desired engine speed on an upshift.

Although engine braking is the preferred speed retardation system, not all engines are provided with engine braking. Thus, other types of speed retardation systems may be actuated as an alternative to engine braking. As one example, a fan may be actuated to increase the load on the engine, and thus decrease the output speed of the engine. Other examples include transmission braking, actuating a shunt resistor to an alternator to dissipate power from the engine, or an exhaust brake valve may be actuated.

In a most preferred embodiment of this invention, an operator is provided with a shift intent switch that provides an indication to the engine control that an upshift is being initiated by the operator. Upon receipt of the signal that an upshift is being initiated, the engine control calculates the desired engine output speed for the next highest gear. Once an upshift is initiated, the engine control actuates a speed retardation system, such as engine braking, to decrease the engine speed rapidly. In a most preferred embodiment of this invention, the engine speed retardation is utilized in combination with an overall speed synchronization system that calculates the desired engine speed at the next highest gear ratio, and controls the fuel being delivered to the engine to achieve that speed. The engine speed synchronization system is preferably utilized on both upshifts and downshifts. However, on upshifts, the additional assistance to rapidly decrease engine speed provided by the inventive engine speed retardation system provides benefits in rapidly reducing the engine speed to the desired level.

The engine control preferably monitors actual engine speed and compares it to the desired speed during synchronization to control the fuel being delivered to the engine to rapidly achieve the desired engine speed. Thus, complicated calculation of the amount of retardation is not necessary. Rather, the engine control receives feedback on the effect of the retardation through actual engine speed.

As an alternative to the method described above, the engine control may also monitor various system parameters to make a prediction of when an upshift could be anticipated. As an example, should engine speed for any one gear be relatively high, the engine control could predict that an upshift is likely. On the other hand, should the same speed be relatively low, the engine control could predict that a downshift could be likely. With this system, when an upshift is predicted, the speed retardation system, such as engine braking, is actuated as described above to achieve the desired engine speed.

These and other features of the present invention can be best understood from the following specification and drawings, the following of which is a brief description.

DETAILED DESCRIPTION OF THE DRAWINGS

FIG. 1 is a graphic representation of engine speed versus transmission output speed at several different gears.

FIG. 2 is a largely schematic view of an embodiment of this invention.

DETAILED DESCRIPTION OF A PREFERRED EMBODIMENT

FIG. 1 graphically shows the relationship of engine output speed to the transmission output speed as the transmission is shifted between several gears (1–3 in this figure). Essentially, there is a sawtooth-shaped plot. In each gear, the engine speed necessary to achieve a particular transmission output speed increases toward a maximum engine speed at a series of peak points P. An engine control could predict that an upshift is likely by identifying an approach of a peak, such as the point P.

When the engine speed approaches the maximum speed an upshift is typically indicated. As shown, upshifts have been initiated at each point P. After an upshift, a higher speed ratio is applied through the transmission and a reduced engine speed is necessary to achieve a smooth shift. The engine speed must be reduced by the amount d to achieve a smooth shift. This speed reduction must occur in a relatively short time when performing an upshift.

Of course, in a real world situation, the plot is not as simple as that shown in FIG. 1. As one major complicating factor, transmission speed is not constant. However, FIG. 1 does provide a description of the problem typically involved in an upshift. When one wishes to shift to a higher gear, the engine RPM must be rapidly reduced through an amount d. Resisting rapid speed reduction are factors such as rotational momentum. A system for achieving rapid speed reduction when an upshift is being performed is disclosed in FIG. 2.

As shown in FIG. 2, vehicle drive 20 incorporates an engine 22 having an output shaft 23 connected to clutch 26. Clutch 26 selectively transmits rotation from output shaft 23 to transmission 28. An input shaft 30 provides input to the multi-speed transmission 28, and an output shaft 32 extends from the transmission 28 to the drive axles of the vehicle. The multi-gear transmission 28 is as known in the art, and incorporates a plurality of different speed ratios that may be selectively actuated to achieve a desired ratio between the engine input speed on shaft 23 and the transmission output speed at shaft 32.

To shift between these ratios, an operator of the vehicle is provided with a stick shift 34. The stick shift preferably allows an operator to manually move the necessary components for shifting. Stick shift 34 is most preferably provided with a shift intent switch 36 that allows an operator to provide an indication of whether an upshift or a downshift is the next shift to be performed. The switch 36 communicates with an electronic control unit 38 that controls fuel injectors 39 leading to engine 22.

ECU 38 also controls an engine braking system shown generally at 40. As is known in the art, engine braking is a concept for placing a load to absorb some of the power delivered to the output shaft 23 of engine 22. In one example, the outlet valves on a particular cylinder are opened before the initiation of the power stroke. Thus, power is absorbed from the compression stroke reducing the engine output speed.

Alternatively, a fan 42 may be selectively connected to be driven by engine 22 to reduce the output speed of shaft 24. In the illustrated embodiment, the ECU 38 controls the actuation of a fan 42 through a clutch 43. When the clutch 43 is actuated, the fan 42 is then powered. By selectively actuating the clutch 43 to drain power away from the output shaft 23, the ECU 38 is able to reduce the output speed on the shaft 24. Transmission braking, actuation of a shunt resistor to drain power to an alternator, or other systems for draining power from the engine may be utilized.

An operator driving the vehicle incorporating drive 20 indicates a shift intent through switch 36. On an upshift, the ECU 38 will need to rapidly reduce engine speed to achieve the desired engine input speed. ECU 38 thus actuates the engine braking system 40, fan 42, or other speed retardation system as necessary to achieve the desired engine speed.

As an alternative to the shift intent switch 36, ECU 38 may be able to predict the next speed ratio that will be engaged by monitoring engine speed. As an example, if the ECU 38 determines that transmission 28 is in a particular gear and recognizes that the engine speed is approaching the maximum engine speed, ECU 38 could predict that an upshift should be initiated at the next transmission shift.

With either method of predicting an upshift, ECU 38 awaits a signal 44 from the transmission that the transmission has been moved to neutral before varying the output speed of shaft 23. To vary the engine speed by ECU 38 while the transmission is still in gear would be undesirable, as it would affect the vehicle output speed without control by the operator. Thus, the ECU preferably does not begin to actuate engine speed adjustment until it receives the neutral signal from line 44. Moreover, the ECU determines that fueling has stopped before actuating the engine braking.

Once the ECU 38 receives a signal that the transmission 28 is in neutral, it may actuate the engine speed retardation system 40 or 42 to rapidly reduce engine speed. As the engine speed at shaft 23 is rapidly reduced to approximate a desired speed ratio as shown in FIG. 1, the operator will be able to smoothly engage the next highest gear ratio with little disruption to the vehicle speed.

The present invention may be incorporated solely as a speed retardation system for any upshift, whether actuated with or without a clutch. However, in a most preferred embodiment, the speed retardation of this invention is incorporated in combination with a system that synchronizes engine output speed with that desired to match the transmission output at the next gear ratio. In such a system, the use of clutch 26 is unnecessary. The inventive speed retardation system makes an engine synchronization system more practical, allowing more rapid upshifting by more rapidly reducing the engine speed.

In this combined system, ECU 38 need not closely control the amount of engine braking or other retardation applied. Rather, ECU 38 simply monitors the output speed of the engine and compares it to the desired engine output speed. The engine output speed desired at the next gear ratio is determined by monitoring the actual transmission output speed and multiplying that actual transmission output speed by the speed ratio at the next expected gear to achieve a desired speed ratio as the shift is being initiated. ECU 38 compares the desired engine speed to the actual engine output speed as both its speed reduction efforts through control of the fuel valve and the inventive speed retardation on an upshift are utilized in combination to rapidly reduce the engine speed. The ECU 28 is thus provided with feedback of the effect of the speed retardation system of this invention and can deactivate the speed retardation system of this invention as the engine speed approaches the desired speed ratio. Production engine speed controllers can be easily modified to achieve the features of this invention. As an example, a production speed controller available from Detroit Diesel Corporation under the trade name "DDEC III" is capable of providing the engine speed control and could be easily modified to incorporate the speed synchronization and speed retardation features of this invention.

Although the ECU may utilize the shift intent to directly control the actuation of the speed retardation system, the ECU might also simply actuate the speed retardation system whenever the desired engine speed is much lower than the actual engine speed, and the transmission is in neutral. That is, no specific shift direction signal is necessarily used to determine when to actuate the retardation system.

The engine speed synchronization system is fully disclosed in co-pending patent application no. 08/508,135 entitled "Engine Speed Synchronization System For Assisting A Manual Transmission Shifting." A preferred method of moving the gear out of engagement to a neutral position without clutching is disclosed in co-pending application Ser. No. 08/508,155 entitled "Method And Apparatus For Assisting And Shifting Transmission To Neutral." A preferred operator signaling mechanism for this system is disclosed in co-pending application Ser. No. 08/508,153 entitled "Four Position Switch For Shift Assist System." A system to provide the neutral signal shown at 44 is disclosed in co-pending patent application Ser. No. 08/508,067 entitled "Neutral Two Position Switch for Multi-Speed Transmission." Other aspects of the controls and components of preferred systems are disclosed in co-pending U.S. patent application Ser. No. 08/508,307 entitled "Operator Input System For Gear Shift Assist Mechanism; and U.S. patent application Ser. No. 08/507,996 entitled "Automatic Range Shift For Multi-Speed Transmission." The total combined system is disclosed in U.S. patent application Ser. No. 08/508,156 entitled "Combined System For Assisting Shifting Of Manual Transmission Without Clutching." Each of the above identified applications is filed on even date with this Application.

Although a preferred embodiment of this invention has been disclosed, a worker of ordinary skill in the art would recognize that certain modifications would come within the scope of this invention. For that reason the following claims should be studied to determine the true scope and content of this invention.

We claim:

1. A method of operating a vehicle drive of a vehicle having an engine including an engine output shaft, a transmission that includes a plurality of gear members and that is connected to the engine output shaft by a clutch, an engine control for controlling the output speed of the engine output shaft, a manual shift lever that permits an operator to selectively and manually engage the gear members and a speed retardation system for rapidly reducing the speed of the engine output shaft, comprising the steps of:

A) monitoring the operation of the vehicle with the engine control to thereby predict when a transmission upshift is likely;

B) manually initiating a transmission shift by manually moving the shift lever to disengage a currently engaged gear member without disengaging the clutch;

C) determining whether the transmission shift of step (B) is an upshift; and

D) actuating the engine speed retardation system when an upshift is being performed to rapidly decrease the output speed of the engine output shaft.

2. The method of claim 1, further comprising the step of generating a neutral signal indicating that the transmission has been moved to neutral, and wherein step (D) is performed only after the neutral signal is received by the engine control.

3. The method of claim 1, wherein step (A) includes the substep of predicting a desired engine speed at a next highest speed ratio to achieve a smooth transition to the next highest speed ratio, and wherein step (D) includes the step of controlling at least one engine variable, using the engine control, to rapidly achieve the desired engine speed.

4. The method of claim 3, wherein step (D) includes controlling the amount of fuel being delivered to the engine to achieve the desired engine speed.

5. The method of claim 4, wherein the speed retardation system is an engine braking system and step (D) is performed by using the engine braking system to reduce the output speed of the engine output shaft.

6. The method of claim 4, wherein step (D) includes actuating an additional load on said engine.

7. The method of claim 1, wherein an operator is provided with a shift intent switch that is manipulable by an operator to generate an upshift signal when an upshift is desired and wherein step (A) is performed by determining when an upshift signal is generated.

8. The method of claim 1, wherein step (A) includes monitoring vehicle conditions using the engine control.

9. A method of operating a vehicle having an engine including an output shaft, a multi-speed transmission that includes a plurality of gear members and that is connected to be driven by the engine output shaft, a speed retardation system to rapidly decrease the output speed of the engine output shaft, an engine control selectively operable to activate the speed retardation system, a shift lever that permits an operator to selectively and manually engage the gear members and an operator shift intent switch to allow an operator to provide an upshift signal to the engine control, comprising the steps of:

A) manually manipulating the operator shift intent switch to thereby indicate that a transmission upshift is being actuated;

B) sensing an indication of an upshift from the operator switch;

C) predicting a desired engine speed at the next highest gear based upon a sensed transmission output speed and the speed ratio at the next highest gear;

D) manually initiating an upshift of the transmission using the shift lever to manually disengage a currently engaged gear member;

E) providing a signal from the transmission to the engine control once the transmission has been manually moved out of an engaged gear position to a neutral position; and F) actuating the speed retardation system to rapidly decrease the engine output speed toward the desired engine speed.

10. The method of claim 9, further comprising controlling the engine speed by varying the fuel delivered to the engine, using the engine control.

11. The method of claim 10, wherein step (F) includes using the engine control to perform the substeps of monitoring actual engine speed and comparing the actual engine speed to the desired engine speed and deactivating the speed retardation system as the actual and desired engine speeds approach each other.

12. A vehicle drive, comprising:

an engine having an output shaft;

a multi-speed transmission having an input and an output for driving a vehicle and a plurality of selectively engagable gear members;

a clutch connecting said engine output shaft to said transmission input shaft;

an engine speed retardation system to be selectively actuated to reduce the output speed of said engine output shaft;

a shift lever for manually shifting said gear members into and out of engaged positions; and an engine control that senses when an upshift in said multi-speed transmission is being actuated and responsively actuates said speed retardation system upon manual initiation of an upshift by manually moving said shift lever to reduce the speed of said engine output shaft.

13. The vehicle drive of claim 12, wherein said speed retardation system includes an additional load that is adapted to be placed on said engine.

14. The vehicle drive of claim 13, wherein said additional load is an engine braking system that absorbs power from said engine.

15. The vehicle drive of claim 13, wherein said additional load is a fan adapted to be driven by said engine.

16. The vehicle drive of claim 12, wherein said transmission includes a sensor that determines when said transmission has been moved to a neutral position and responsively provides a neutral signal to said engine control which begins actuation of said speed retardation system responsive to said neutral signal.

17. The vehicle drive of claim 12, further comprising an operator shift intent switch to provide an upshift signal and wherein said engine control actuates said speed retardation system responsive to said upshift signal.

18. The vehicle drive of claim 12, wherein said engine control is operable to sense vehicle conditions and responsively predict when an upshift is to be expected.

19. The vehicle drive of claim 12, wherein said engine control is operable to predict a desired engine speed at a next expected gear ratio.

20. The vehicle drive of claim 19, wherein said engine control is further operable to synchronize the engine speed with said desired engine speed at the next expected gear ratio during a transmission speed shift.

* * * * *

UNITED STATES PATENT AND TRADEMARK OFFICE
CERTIFICATE OF CORRECTION

PATENT NO. : 5,830,104
DATED : November 3, 1998
INVENTOR(S) : Desautels et al.

It is certified that error appears in the above-identified patent and that said Letters Patent is hereby corrected as shown below:

Title page,
Item [73], should read as follows:
[73]　　Assignee:　　Meritor Heavy Vehicle Systems, LLC.
　　　　　　　　　　Troy, Mi.

Detroit Diesel Corporation, Detroit MI

Signed and Sealed this

Fourteenth Day of May, 2002

Attest:

Attesting Officer

JAMES E. ROGAN
*Director of the United States Patent and Trademark Office*